June 23, 1970 E. J. DRAPER 3,516,676

RECORDING PLAYBACK MECHANISM

Filed March 18, 1966 2 Sheets-Sheet 1

Everett J. Draper
INVENTOR.

BY R. E. Geauque
ATTORNEY

June 23, 1970 E. J. DRAPER 3,516,676

RECORDING PLAYBACK MECHANISM

Filed March 18, 1966 2 Sheets-Sheet 2

Everett J. Draper

INVENTOR.

BY R. E. Geaugue

ATTORNEY

United States Patent Office 3,516,676
Patented June 23, 1970

3,516,676
RECORDING PLAYBACK MECHANISM

Everett J. Draper, Cyprus, Calif., assignor to Rheem Manufacturing Company, New York, N.Y., a corporation of California Filed Mar. 18, 1966, Ser. No. 535,447
Int. Cl. G11b *25/04*
U.S. Cl. 274—9 3 Claims

ABSTRACT OF THE DISCLOSURE

The playback mechanism has a driving wheel, a brake, and a rotatable switch movable successively between "off," "pause" and "play" positions. A spring mechanism connects the rotary switch to the driving wheel and to the brake so that the driving wheel is engaged and the brake is disengaged in the "play" position of the switch, and the brake is engaged and the driving wheel is disengaged in both the "pause" and "off" positions of the switch.

This invention relates to recording playback mechanisms, and, more particularly, to an improved playback machanism that is especially adapted for use in so called "teaching machines," whereby playback of the recording can be stopped without de-energizing the electronic portions of the system.

In modern teaching methods, recordings are often used to supplement lectures by an instructor. Generally, the recordings are reproduced through a loud-speaker to a student audience by means of a playback mechanism under the control of the instructor. Frequently, the instructor desires to interrupt the recording to ask questions of the students or to interject remarks or additional information.

Heretofore, in order to interrupt the playback of the recording, it has been necessary to de-energize the entire playback mechanism, including the electronic amplifying portion. This has been a considerable annoyance to the instructor, because, when he desires to resume playback, a time lag is involved to permit the electronics to "warm up." Thus, a portion of the recording may be lost to the students.

The present invention is applied to a mechanism for playing back recordings on discs, wherein the disc is mounted on a rotating turntable that is mechanically driven by a wheel frictionally engaging a circumferentially depending rim or flange on the turntable. Specifically, the invention provides means for dis-engaging the driving wheel and braking the rotating turntable, without de-energizing the entire mechanism. This control is under the command of the instructor, who has merely to turn a rotary switch to stop rotation of the turntable. When the instructor returns the switch to a "play" from a "pause" position, playback is immediately resumed and none of the recording playback is lost.

In the present invention, a mechanical linkage is provided, which is controlled by the position of the previously-mentioned rotary switch, that moves the driving wheel out of engagement with the turntable and simultaneously applies a brake to the turntable. Thus, the turntable stops rotation virtually instantaneously, but the electronic amplifying portions of the system remain energized.

Further objects and advantages of the invention will become apparent from the following description of one embodiment thereof, taken in conjunction with the accompanying drawings, in which.

Figure 1:
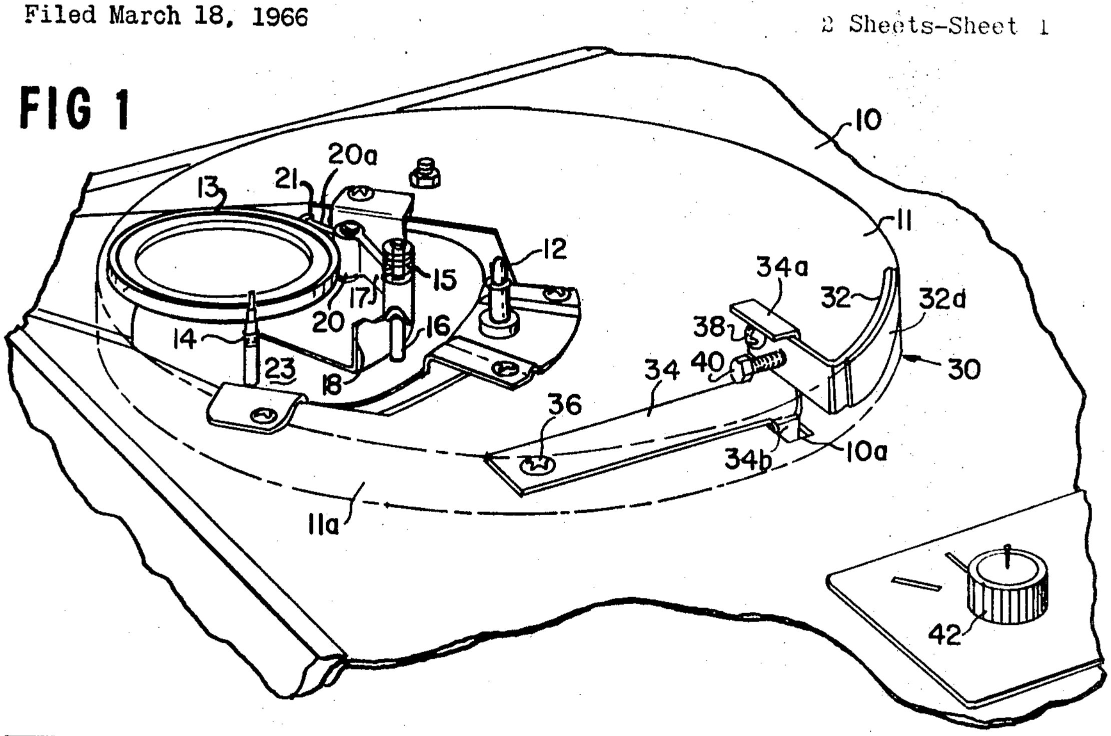
FIG. 1 is a perspective view of a playback mechanism embodying the invention.

FIG. 1 is a perspective view illustrating the invention embodied in a playback mechanism, which is mounted on a chassis 10. The chassis 10 is generally mounted on the top of a case or the like (not shown) which protects the parts of the mechanism and provides easy portability for the entire assembly. The mechanism incorporates a turntable 11, which is conventionally mounted on a rotatable spindle 12. Inasmuch as many portions of the playback apparatus are quite conventional, they will not be described in detail.

The turntable 11 is rotated by a driving wheel 13, whose circumference is covered by a material such as rubber having good frictional properties, which material, when the wheel 13 is in "play" position, engages a depending rim or flange 11*a* on the turntable. In turn, the wheel 13 is rotated by a spindle 14, which is driven by a motor (not shown) mounted underneath the chassis 10. The spindle 14 is provided with sections of various diameters at its upper end, and the wheel 13 may be moved up and down by conventional means, so that it may be engaged by the various sections of the spindle 14 to accommodate recordings having various playback speeds. Of course, the smaller the diameter of the spindle 14, the slower is the rotation rate of the wheel 11. A coil spring 15 mounted on a post 16 is connected to the wheel 13 by a lever 17 and an arm 20 which rotatably supports the wheel 13 and the spring biases the wheel 13 downwardly. The conventional mechanism for raising the driving wheel 13 works against the bias of the spring 15 to raise the wheel 13. The lever 17 moves up and down the post 16 under control of a cam 18, which is movable between various positions by a manually actuated switch (not shown) to control the speed of rotation of the turntable.

Figure 2:
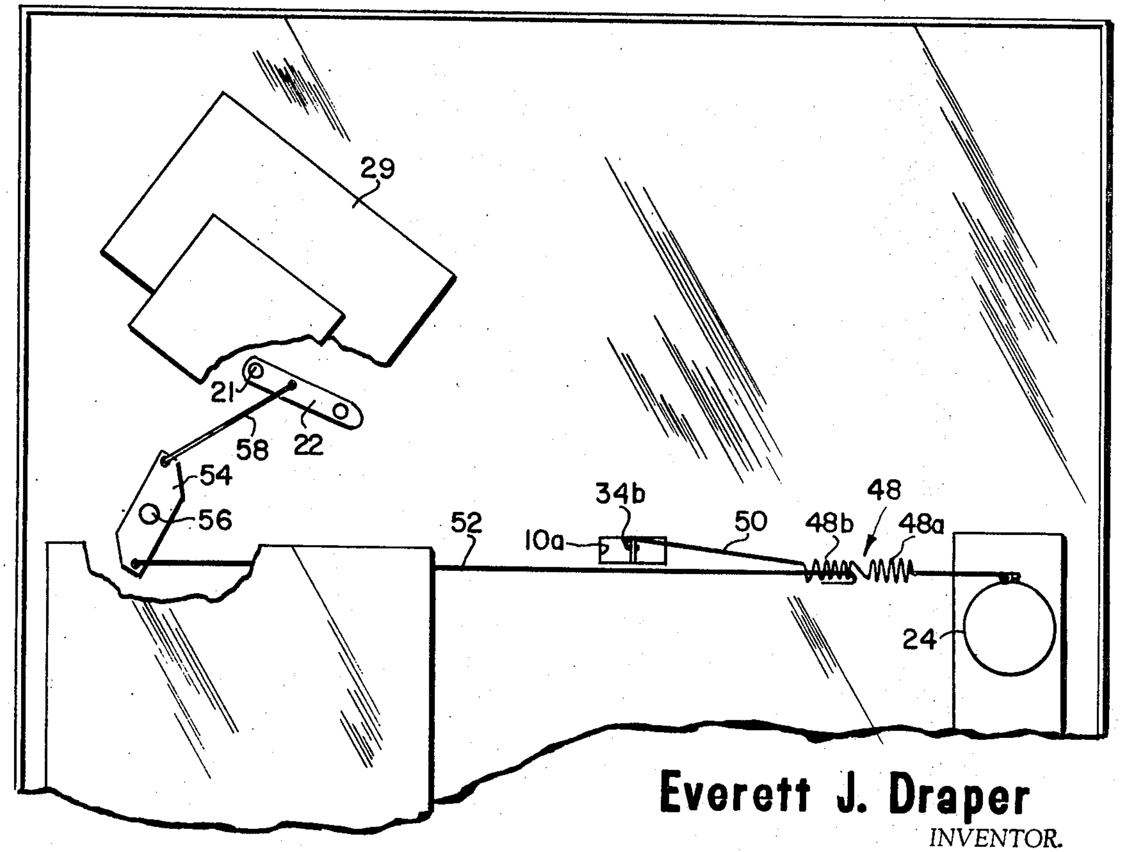
FIG. 2 is a bottom view showing the mechanical linkage that moves the driving wheel and brake into and out of engagement with the turntable.

The arm 20 that supports the wheel 13 is provided with a slot 20*a*, the sides of which are engaged by a pin 21. The pin 21 is mounted on a lever 22 (FIG. 2) on the underside of the chassis 10, which pin 21 extends through an opening 23*a* in a structure 23 that is secured to the chassis 10 and supports the drive motor and its related mechanical parts. As will be later described in detail, the lever 22 is actuated by a switch 24 to cause the driving wheel 13 to move into and out of engagement with the flange 11*a* of the turntable 11.

The mechanism is also provided with a braking device, indicated generally by the numeral 30, which frictionally engages the flange 11*a* on the turntable to stop rotation of the turntable when the switch 24 is turned to the "pause" or "off" positions. The braking device comprises an arcuately shaped brake shoe 32 having a center of curvature that coincides with that of the turntable 11. The brake shoe 32 is provided with a frictional material such as felt 32*a* on its surface that engages the rim of the turntable. It is particularly pointed out that the brake mechanism 30 is so mounted as to be practically self-actuating. In other words, when the brake is actuated, it tends to "dig" itself into the rim 11*a* of the turntable, because the brake shoe 32 is so mounted about a pivotal axis that the brake shoe opposes rotation of the turntable 11. The braking device 30 is actuated by the same switch that actuates the driving wheel 13, so that, when the driving wheel 13 is moved out of contact with the turntable 11, the braking device is actuated.

The brake shoe 32 is secured to one end of a lever 34 that is pivotally mounted as at 36 on the chassis 10. The shoe 32 is secured to an upstanding portion 34*a* of the lever 34 by a screw 38, and a set screw 40 threaded into the brake 30 bears against the upstanding portion 34*a* and provides means for adjusting the brake shoe position. The lever 34 is also provided with a depending lip 34*b*, which extends downwardly through an opening 10*a* in the chassis 10. A wire is secured to the depending lip 34*b* and is actuated by the switch 24 to move the braking device 30, as will be hereinafter described in detail.

Figures 5, 6:
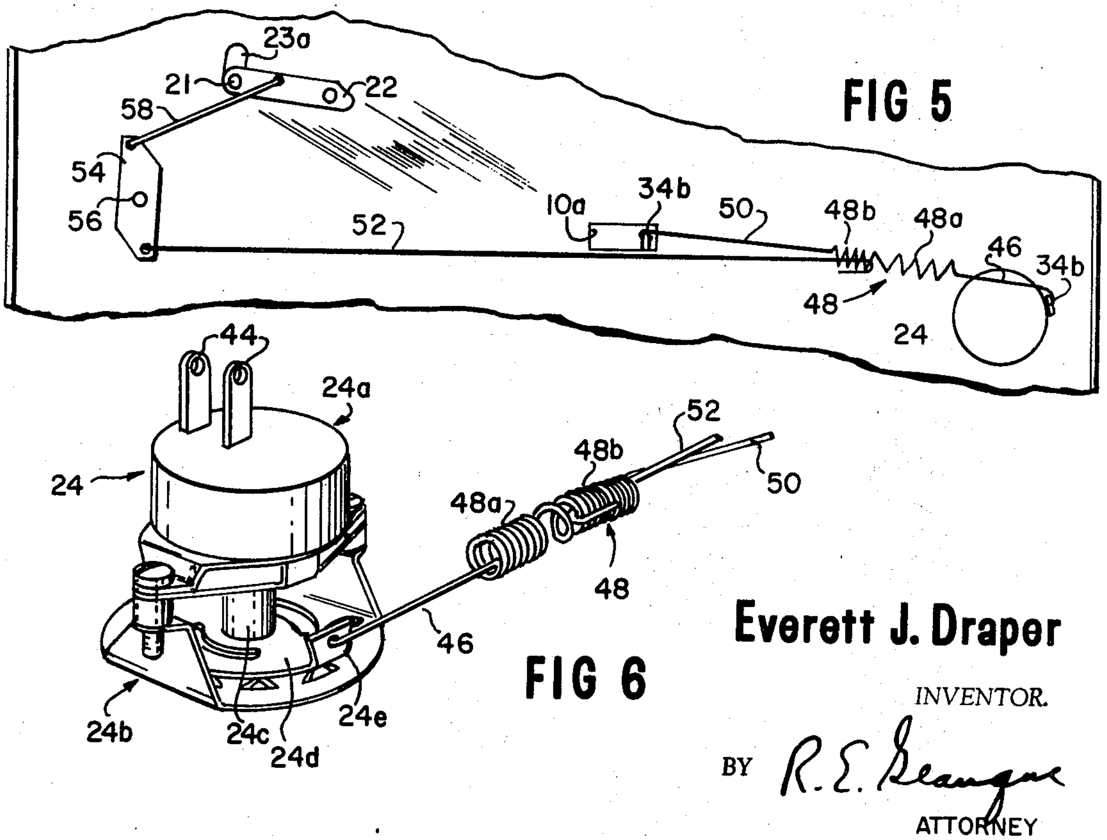
FIG. 6 is a perspective view of the switch that controls the position of the mechanical linkage.

As shown in FIG. 6, the switch 24, which is mounted on the chassis 10, is composed of two portions 24*a* and 24*b*. The portion 24*a* energizes and de-energizes the electronic amplifying portion of the mechanism, which is mounted on sub-chassis 29 under the chassis 10, and the portion 24*b* mechanically actuates the driving wheel 13 and the braking device 30. The switch 24 has a rotatable shaft 24*c* which is provided with a knob 42, and is rotatable by an operator between three positions, namely, "off," "pause" and "play." As previously mentioned, when the switch 24 is in the "off" or "pause" positions, the driving wheel 13 is disengaged from the turntable 11 and the braking device 30 engages the turntable.

The portion 24*a* of the switch 24 is conventional in nature and provides means for energizing the electronic portion of the mechanism when the switch is in "pause" or "play" positions and de-energizing it when the switch is in the "off" position. That portion of the switch is provided with a pair of lugs or posts 44 which are connected between a conventional power source and the electronic amplifying portion of the mechanism.

The mechanical portion 24*b* of the switch 24 comprises a plate 24*d* having an upstanding lug 24*e* to which is secured a wire 46 extending through an opening in the lug 24*e*. The other end of the wire 46 is secured to one end of a two-section spring 48, having sections 48*a* and 48*b*. The other end of the spring 48 is connected to the depending lip 34*b* on the lever 34 by a wire 50. The mid-point of the spring 48 between the sections 48*a* and 48*b* is connected by a wire 52 to one end of a lever 54 pivoted approximately at its mid-point, as at 56. Of course, the lever 54 is mounted on the under side of the chassis 10.

The end of the lever 54 opposite that to which the wire 52 is connected is connected to one end of a wire 58 the other end of which is connected to the lever 22 previously mentioned that bears the pin 21 that causes the driving wheel 13 to move into and out of engagement with the turntable 11.

Figure 3:
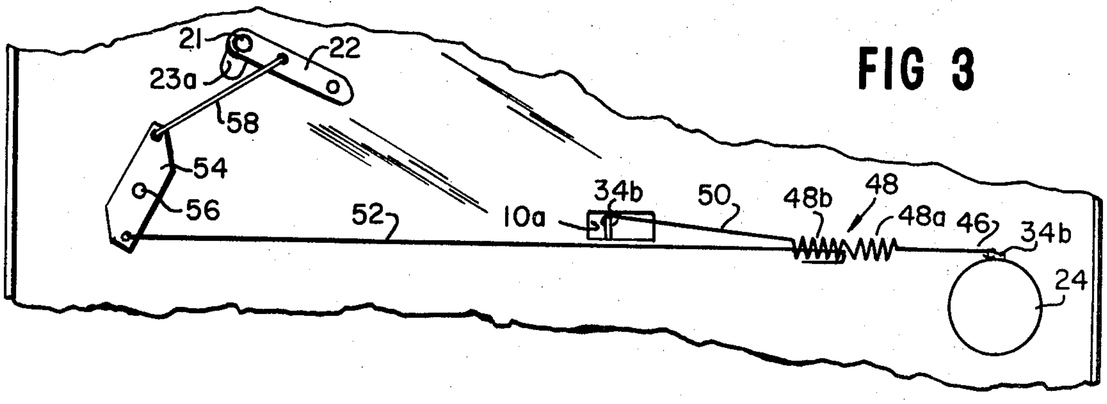
FIGS. 3, 4 and 5 show three different positions of the mechanical linkage shown in FIG. 2.
Figure 4:
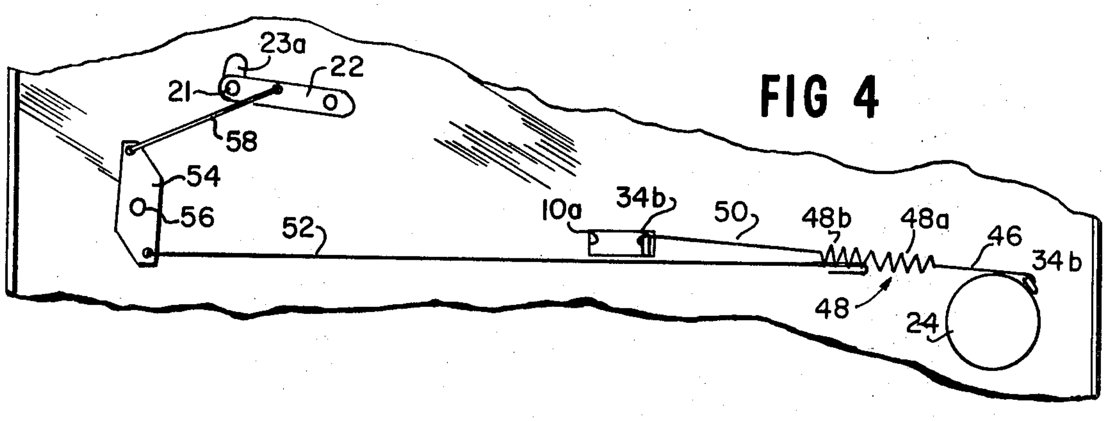

FIGS. 3, 4 and 5 illustrate the various positions of the levers 22 and 54 when the switch 24 is in its three various positions. For example, when the switch 24 is in "play" position, it is rotated as far counterclockwise (as seen in FIGS. 3, 4 and 5) as it will turn. This relaxes the spring 48, which permits the lever 22 to rotate in a clockwise direction and the lip 34*b* to move to the left. Thus, the driving wheel 13 engages the flange 11*a* on the turntable, causing the turntable to rotate, and the brake shoe 32 moves away from the flange on the turntable. When the switch 24 is turned clockwise to its next setting, that is, to the "pause" position, the lever 22 is rotated in a counterclockwise direction and the driving wheel 13 is disengaged from the turntable. The lug 34*b* moves to the right under the action of the spring 48, which causes the brake shoe 32 to engage the flange 11*a* on the turntable and stop its rotation. When the switch 24 is turned to its next clockwise position, as shown in FIG. 5, to de-energize the electronic portion of the mechanism, the portion 48*a* of the spring 48 is further extended but the positions of the levers 22 and 54 do not change. This is because the pin 21 has engaged the bottom of the slot 23*a* and the lug 34*b* has engaged the right end of the slot 10*a*.

Although one embodiment of the invention has been illustrated and described, it is apparent that many modifications may be made by one skilled in the art without departing from the true scope and spirit of the invention.

What is claimed is:

1. A recording playback mechanism comprising:
a turntable;
driving means for engaging and rotating said turntable;
braking means for engaging said turntable and stopping rotation thereof;
mechanical means for substantially simultaneously disengaging said driving means from said turntable and engaging said braking means with said turntable;
a rotary switch for activating said mechanical means and having "off," "pause" and "play" positions, in that order;
said mechanical means comprising spring means connecting said driving means and said braking means to said rotary switch;
said switch being positioned to relax said spring means for engaging said driving means and disengaging said braking means when in the "play" position;
said switch being rotated from said "play" to "pause" position to tension said spring means and disengage said driving means and engage braking means and being further rotated from said "pause" to said "off" position while maintaining tension in said spring means to maintain disengagement of said driving means and engagement of said braking means.

2. The mechanism described by claim 1 wherein said spring means comprises:
two expandable portions connected together, one end of said spring means being connected to said rotary switch and the other end being connected to said braking means, and a link for connecting said driving means to said spring means at a location intermediate said expandable portions;
both said portions being relaxed when said switch is in "play" position, both said portions being expanded when said switch is in "pause" position, and one of said portions is further expanded when said switch is in "off" position.

3. The mechanism defined by claim 2, wherein said one portion of said spring that is further extended when said switch is in "off" position is adjacent said rotary switch, and further extension of the other portion is mechanically prevented.

References Cited

UNITED STATES PATENTS

| | | | |
|---|---|---|---|
| 3,118,679 | 1/1964 | Lyon | 274—9 |
| 2,989,311 | 6/1961 | Vistain | 274—10 |
| 2,627,414 | 2/1953 | Sear | 274—9 |
| 2,567,092 | 9/1951 | Williams | 274—13 |
| 3,336,031 | 8/1967 | Ammon et al. | 274—2 |

OTHER REFERENCES

Sams, Tape Recorder Manual, volume 2, June 1958, Section No. 18 (Symphonic), pp. 6, 7, 10 and 21.

WILLIAM D. MARTIN JR., Primary Examiner

U.S. Cl. X.R.

274—39